United States Patent [19]

Krolak et al.

[11] 4,082,156
[45] Apr. 4, 1978

[54] DRIVE MECHANISM HAVING SEPARABLE HOUSING

[75] Inventors: Ronald L. Krolak, Morton; George W. Cackley, Hanna City; Marvin G. Getz, Morton; Arthur J. Ritter, Jr., Metamora, all of Ill.

[73] Assignee: Caterpillar Tractor Co., Peoria, Ill.

[21] Appl. No.: 701,704

[22] Filed: Jul. 1, 1976

[51] Int. Cl.² ............................................. B62D 55/12
[52] U.S. Cl. ................................. 180/9.62; 180/70 R; 192/13 R
[58] Field of Search .................. 180/70 R, 6.48, 9.62; 192/13 R

[56] References Cited

U.S. PATENT DOCUMENTS

| | | | |
|---|---|---|---|
| 2,781,858 | 2/1957 | Kelley | 192/13 R |
| 2,885,043 | 5/1959 | Martinson | 192/13 R |
| 3,157,257 | 11/1964 | Root | 192/18 A |
| 3,177,994 | 4/1965 | Jewson | 192/18 A |
| 3,398,819 | 8/1968 | Ruhl | 192/13 R X |
| 3,460,645 | 8/1969 | Brown | 192/13 R |
| 3,580,345 | 5/1971 | Brown | 180/6.7 X |
| 3,638,773 | 2/1972 | Lewis | 192/18 A |
| 3,771,627 | 11/1973 | Caldwell | 192/3 R X |

Primary Examiner—Joseph F. Peters, Jr.
Assistant Examiner—John A. Pekar
Attorney, Agent, or Firm—Wegner, Stellman, McCord, Wiles & Wood

[57] ABSTRACT

A drive mechanism having a steering clutch assembly, a brake assembly, and a final drive assembly housed within a unitary housing defined by separable steering clutch assembly, brake assembly and final drive assembly housings removably secured together. The individual housings define flanges which may be secured together to form the unitary housing. The secured flanges may, in turn, be secured to another support structure of the drive mechanism.

8 Claims, 5 Drawing Figures

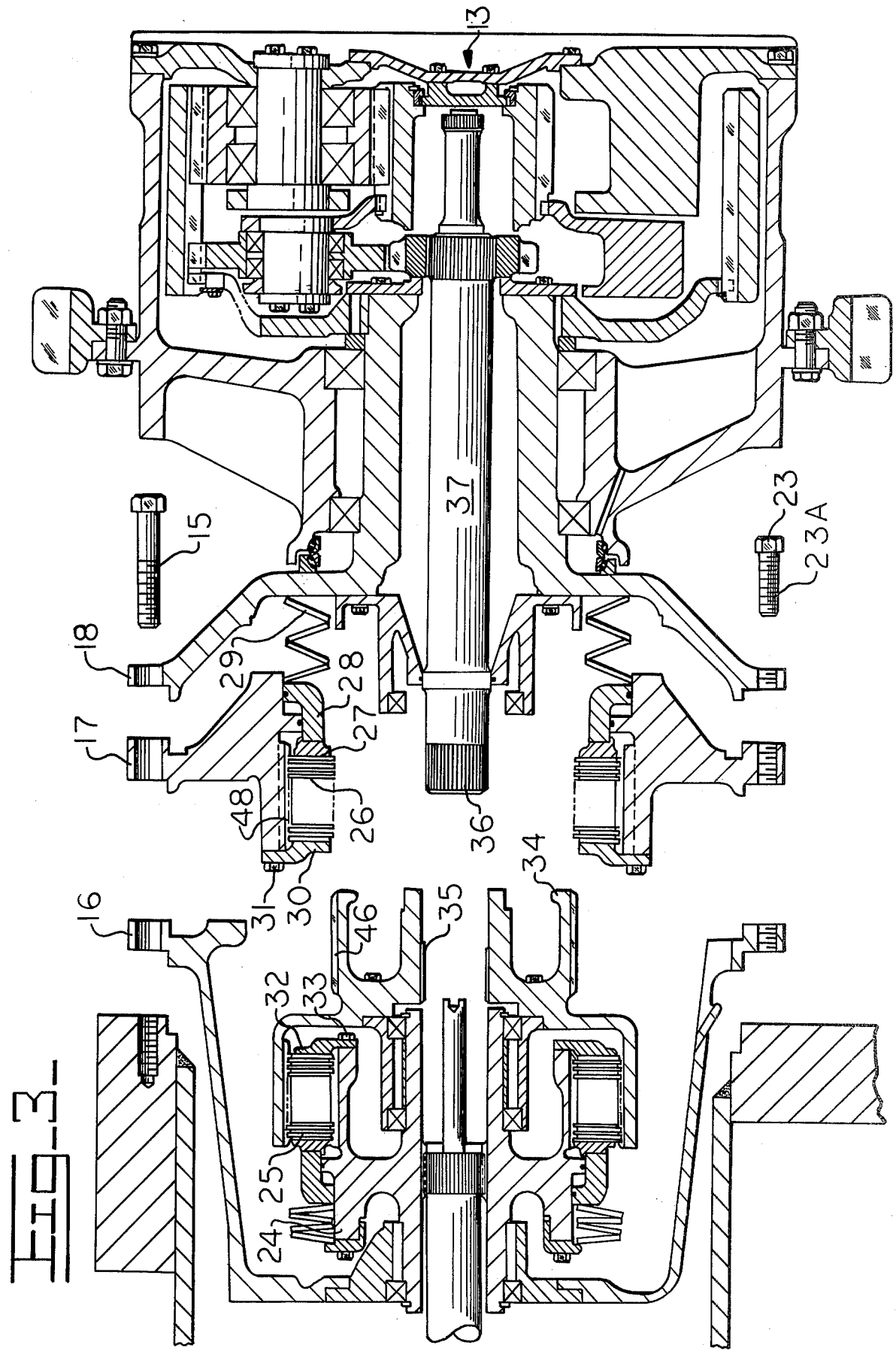

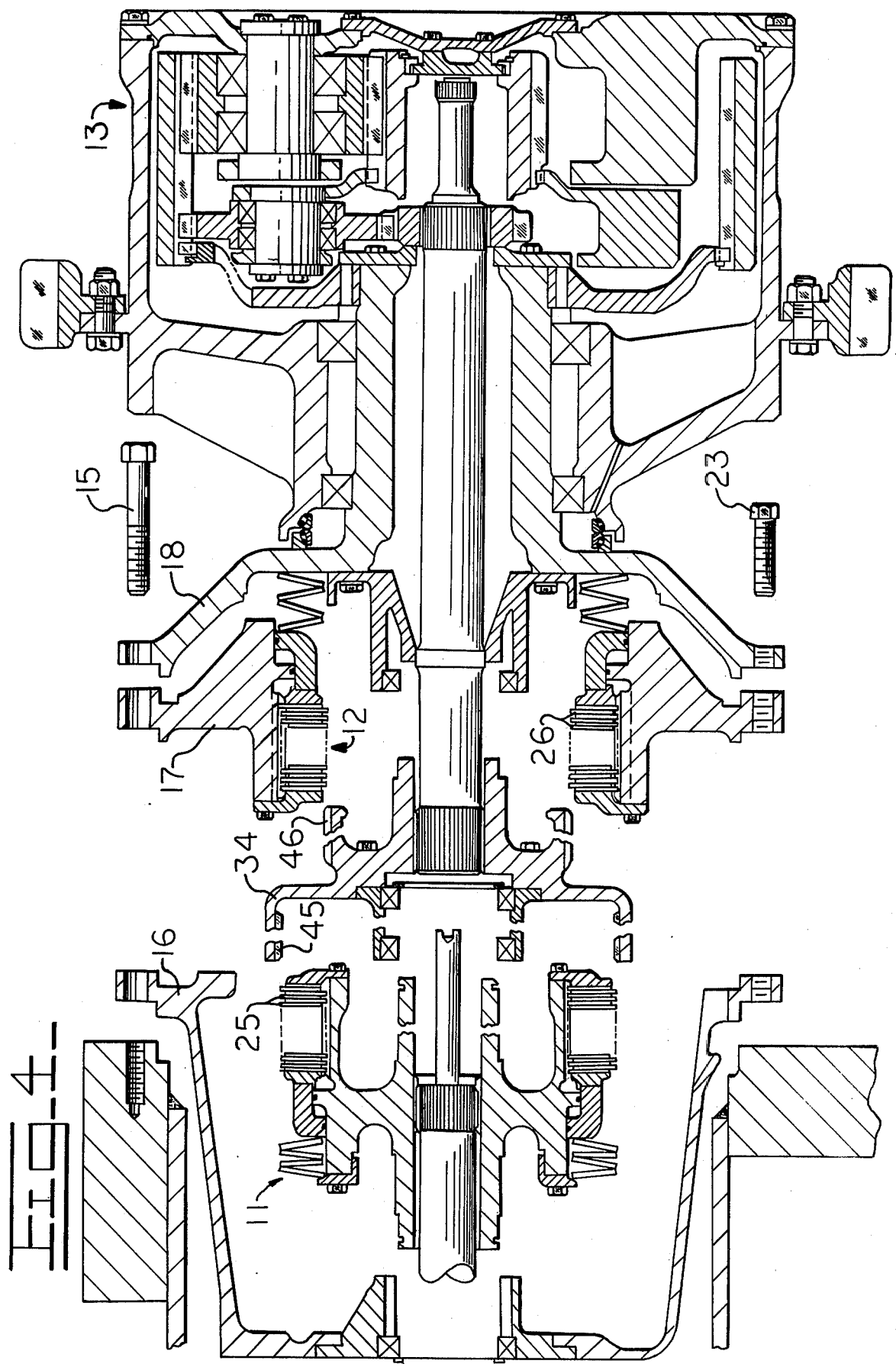

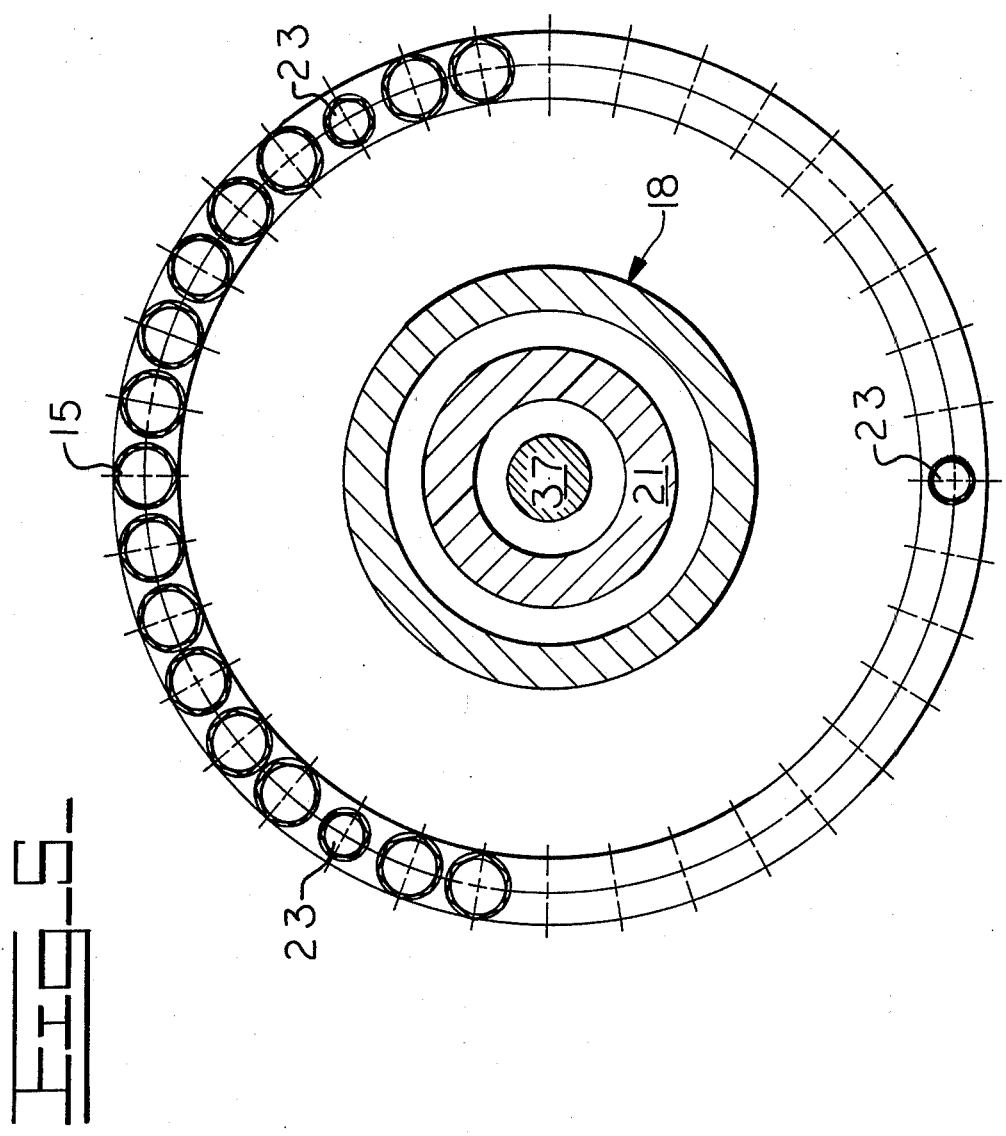

DRIVE MECHANISM HAVING SEPARABLE HOUSING

BACKGROUND OF THE INVENTION

1. Field of the Invention

This invention relates to drive mechanisms and in particular to means for providing facilitated assembly and disassembly of drive mechanisms.

2. Description of the Prior Art

One improved form of final drive for use in a vehicle is illustrated in United States Letters Pat. No. 3,771,627 of Samuel I. Caldwell et al, which patent is owned by the assignee hereof. The final drive disclosed therein includes a modular parking brake assembly detachably mounted between a hydrostatic drive motor and the speed reduction gear train which is operatively connected to the drive motor. The parking brake assembly includes separable brake and brake actuating modules mounted in a housing for facilitated assembly and servicing. The brake assembly is arranged to be removed as a unit without exposing internal components thereof and without having to remove attendant major components of the vehicle.

Robert S. Root, in United States Letters Pat. No. 3,157,257 shows an oil immersed, actuated clutch and brake assembly wherein the clutch assembly and brake assembly are removable from the vehicle as a unit.

Rowland Jewson, in United States Letters Pat. No. 3,177,994, shows a fluid-actuated clutch and brake wherein the entire internal assembly may be withdrawn from the outer housing through an opening at one end thereof while leaving the clutch cup mounted to the driving shaft. Further, removal of set screws from the motor drive shaft permits the clutch cup bearing to be removed together with the clutch cup if desired. Upon removal of the assembly from the housing, the elements of the assembly are available for servicing.

In United States Letters Pat. No. 3,638,773 of William E. Lewis et al, a clutch brake unit is disclosed incorporating a clutch disk pack, a separate brake disk pack, and an interposed piston unit. The housing is formed in three major sections, one of which encloses the input shaft and the clutch pack. A second section of the housing contains the output shaft and the brake pack. An intermediate piston housing contains the piston unit. The brake and clutch plate assemblies may be changed as desired by the removal of the housing section involved, permitting access to the plates thereof without requiring disassembly from the associated housing.

SUMMARY OF THE INVENTION

The present invention comprehends an improved drive mechanism having a steering clutch assembly formed of a plurality of subassemblies, a brake assembly formed of a plurality of subassemblies, and a final drive assembly wherein a plurality of housings are removably secured to define a unitary housing for the mechanism. The individual housings include a first housing for housing the steering clutch assembly, a second housing for housing the brake assembly, and a third housing for housing the final drive assembly. Removable securing means are provided for securing the housings together to define the desired unitary mechanism housing.

In the illustrated embodiment, the housings are secured together by means of flanges carried by the housings, and securing means extending between the flanges.

In the illustrated embodiment, the flanges are provided with through holes and threaded securing means are inserted into the holes with the holes arranged in coaxial alignment for securing the three housings unitarily. Additionally, the three holes may be utilized in conjunction with a second threaded securing means extended therethrough into threaded engagement with a bevel gear case for securing the entire assembly thereto.

In the illustrated embodiment, the housing flanges comprise annular flanges and the through holes may be arranged in an annular array therein.

The steering clutch assembly may be carried by the first housing for removal as a unit therewith and the brake assembly may be carried by the second housing for removal as a unit therewith.

Thus, the drive mechanism of the present invention is extremely simple and economical of construction while yet providing the highly desirable features and advantages discussed above.

BRIEF DESCRIPTION OF THE DRAWING

Other features and advantages of the invention will be apparent from the following description taken in connection with the accompanying drawing wherein:

FIG. 3 is a longitudinal diametric exploded section illustrating the disassembly of the mechanism into three separate assemblies;

FIG. 4 is a longitudinal diametric exploded section illustrating the disassembly of a carrier portion of the mechanism from the clutch assembly; and FIG. 5 is a transverse section taken substantially along the line 5—5 of FIG. 1.

DESCRIPTION OF THE PREFERRED EMBODIMENT

Figure 1:
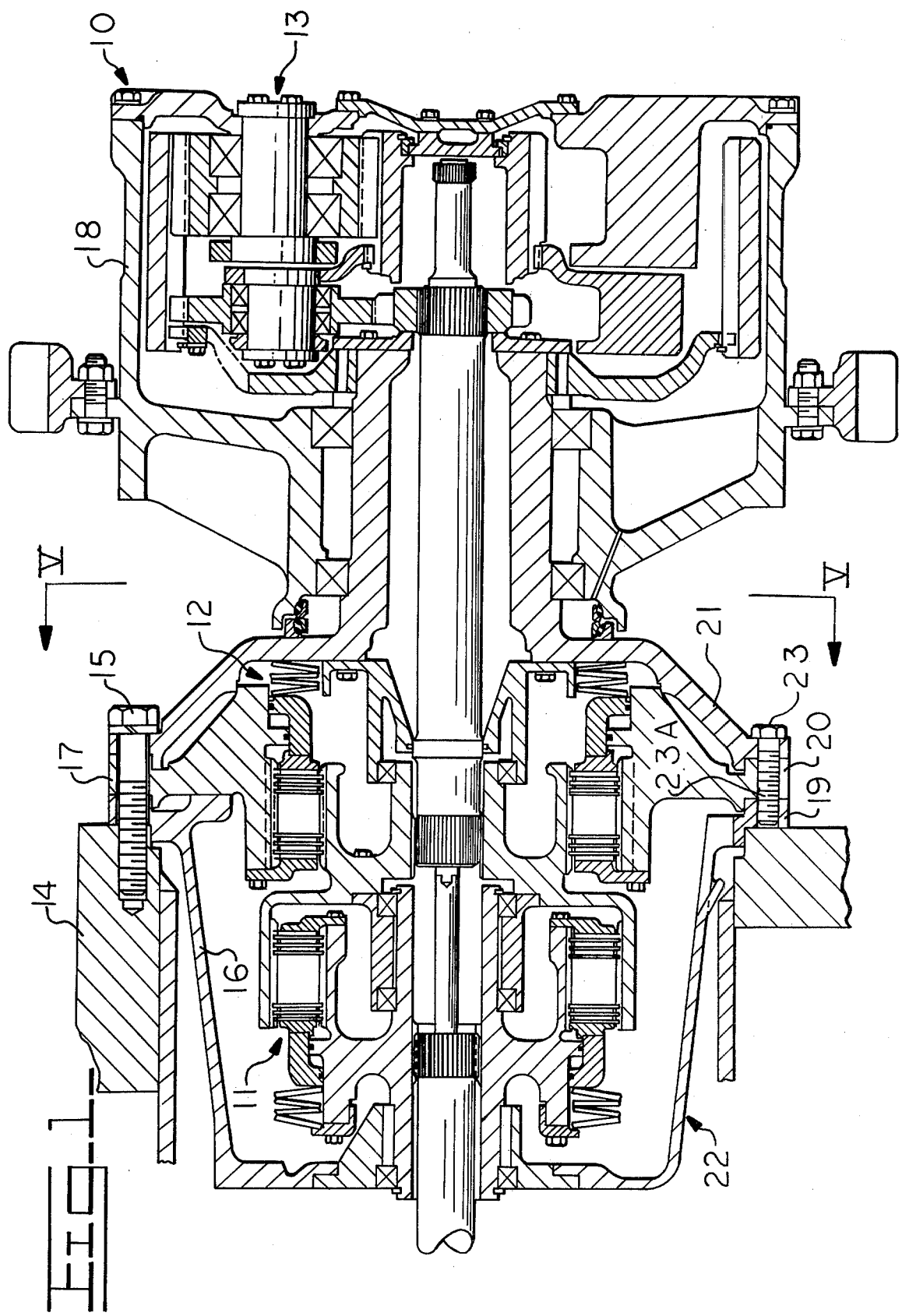
FIG. 1 is a longitudinal diametric section of a drive mechanism embodying the invention.

In the exemplary embodiment of the invention as disclosed in the drawing, a drive mechanism generally designated 10 is shown to include a steering clutch assembly generally designated 11, a brake assembly generally designated 12, and a final drive assembly generally designated 13.

As shown in FIG. 1, the mechanism 10 is secured to a bevel gear case generally designated 14 by suitable means such as bolts 15.

In the illustrated embodiment, the steering clutch assembly 11 is carried in a first housing 16, brake assembly 12 is carried in a second housing 17, and the final drive assembly is carried in a third housing 18.

First housing 16 defines an annular flange 19, second housing 17 defines an annular flange 20, and third housing 18 defines an annular flange 21 which, in the assembled arrangement of the mechanism, are juxtaposed concentrically with the bolts 15 extending through the flanges. Thus, bolts 15 not only serve to secure the mechanism to the bevel gear case 14, but also serve to secure the individual housings 16, 17 and 18 together as a unit to form a composite, or unitary, overall housing generally designated 22 of the mechanism.

Figure 2:
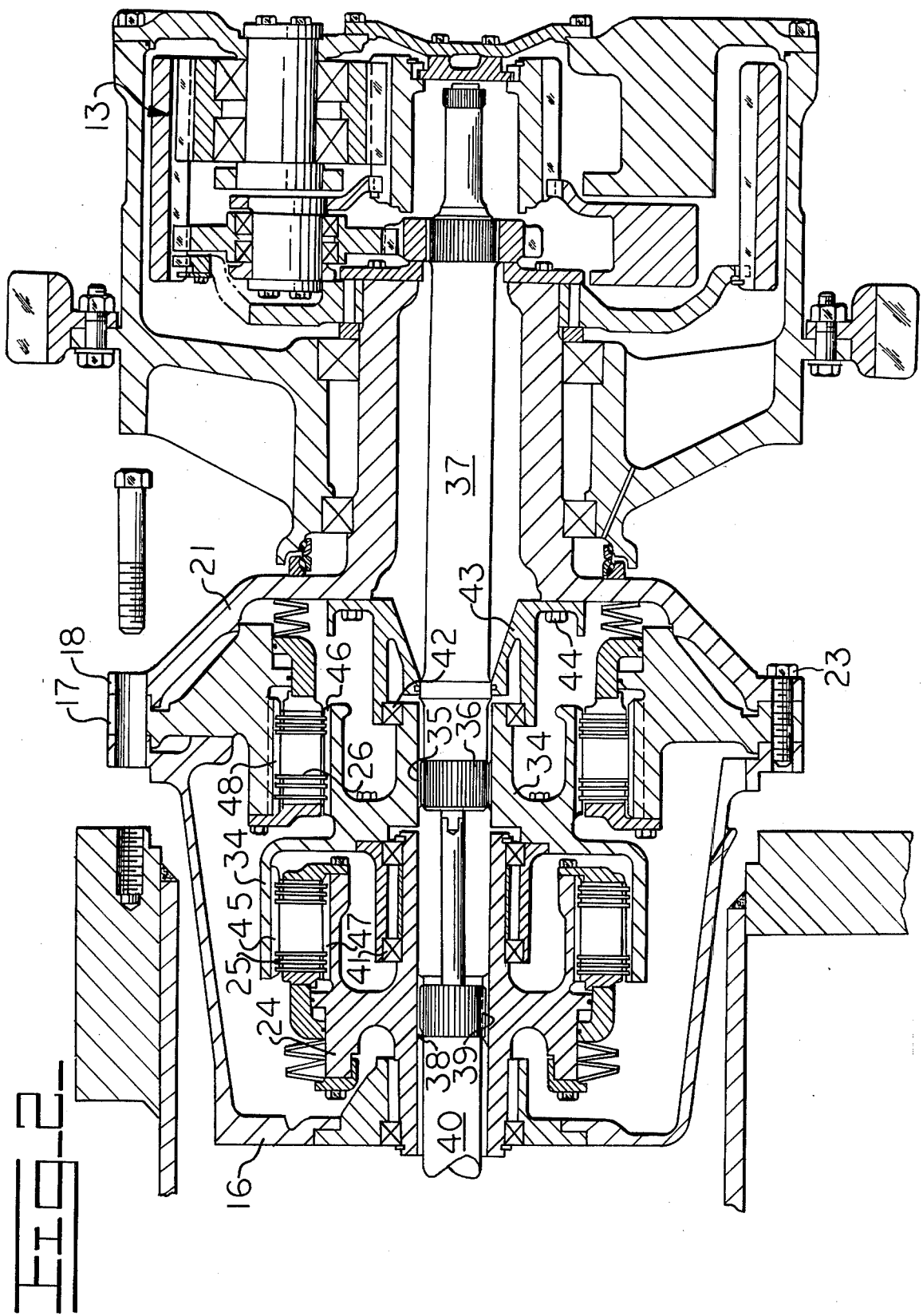
FIG. 2 is a longitudinal diametric section illustrating the removal of the mechanism from a bevel gear case to which the mechanism is normally mounted.

In addition to the long bolts 15 which extend fully through the three housing flanges 19, 20 and 21 into threaded engagement with the bevel gear case, the housing flanges are secured together by short bolts 23 having a shank 23a slightly shorter in length than the total thickness of the three flanges. Thus, as shown in FIG. 2, upon removal of the long bolts 15, the mechanism is maintained as a unit by the short bolts 23 so that the entire mechanism may be removed as for servicing thereof unitarily.

As shown in FIG. 3, removal of the short bolts 23 permits the three housings 16, 17 and 18 to be separated for servicing of the drive components carried thereby. Thus, as shown in FIG. 3, upon separation of housing 16, the steering clutch assembly is exposed for servicing, and upon removal of housing 17, the brake assembly is exposed for servicing.

Similarly, the final drive assembly 13 may be serviced upon separation from the housing 17.

In the illustrated embodiment, the steering clutch assembly includes a hub assembly 24 carrying clutch plates 25. The brake assembly includes brake plates 26, a pressure plate 27, a pressure-actuated piston 28, and a Belleville spring 29, as best seen in FIG. 3. A retainer 30 may be secured to the housing 17 by suitable screws 31 for removably retaining the brake plates in the assembly. A similar retainer 32 may be provided removably secured to the hub assembly 24 by suitable screws 33 for removably retaining the clutch plates in the steering clutch assembly.

A carrier 34 may be provided extended between the steering clutch assembly and brake assembly and having an internally splined portion 35 engaging an external spline 36 of an output shaft 37 for driving the final drive assembly 13. The hub assembly 24 is provided with an internal spline 38 which engages an external spline 39 on input shaft 40 disposed coaxially of output shaft 37.

Carrier 34 is rotatably journaled on bearings 41 carried by hub assembly 24, and bearing 42 carried by a retainer 43 mounted to housing 18 by suitable means, such as screws, 44.

Carrier 34 further defines a spline 45 splined to alternate plates of the clutch group 25 and a spline 46 splined to alternate plates of the brake group 26.

As shown in FIG. 2, the other clutch plates of group 25 engage a spline 47 on hub assembly 24 and the other brake plates engage a spline 48 on the brake housing 17.

As best seen in FIG. 4, upon separation of the housings 16, 17 and 18 by removal of the bolts 15 and 23, the steering clutch assembly 11, brake assembly 12, and final drive assembly 13 may be separated for facilitated servicing. Carrier 34 may be separated from the steering clutch assembly and brake assembly by simple longitudinal withdrawal of the splines 45 and 46 from the clutch plates 25 and brake plates 26.

Referring to FIG. 5, it may be seen that the long bolt 15 and short bolt 23 are arranged in an annular array with three such short bolts 23 being arranged at 120° angularly spaced positions and with 11 long bolts 15 equiangularly spaced between each pair of short bolts 23, whereby the housings may be firmly secured in coaxial alignment with uniformly distributed clamping force.

The invention comprehends the provision of an improved drive mechanism as shown wherein three separable housings are removably secured to define a unitary housing in turn secured to a stationary drive mechanism support. Upon separation of the three housings, the drive mechanism components carried therein are separately available for servicing and may be removed as a unit from the respective housings for facilitating such servicing.

The foregoing disclosure of specific embodiments is illustrative of the broad inventive concepts comprehended by the invention.

What is claimed is:

1. In a drive mechanism having a mounting support, a steering clutch assembly formed of a plurality of coaxial subassemblies, a brake assembly formed of a plurality of subassemblies, and a final drive assembly, the improvement comprising: a first housing for housing said steering clutch assembly and defining a first annular flange; a second housing for housing said brake assembly and defining a second annular flange; a third housing for mounting said final drive assembly and defining a third annular flange; removable first securing means arranged in an annular array coaxially of said subassemblies for securing said housing flanges coaxially together to cause said housings to define a unitary housing for said mechanism; and removable second securing means for securing the unitary housing from said mounting support and permitting subsequent disassembly of said unitary housing by removal of said first securing means.

2. The drive mechanism of claim 1 wherein said mounting support comprises a bevel gear case, said unitary housing being secured to said bevel gear case by said second securing means.

3. The drive mechanism of claim 1 wherein said flanges are provided with aligned holes, each of said securing means having threaded means extended through said holes.

4. The drive mechanism of claim 1 wherein said flanges are provided with aligned holes, said first securing means having first threaded means extended through a portion of said aligned holes to secure said housings together, and said second securing means having second threaded means exended through other of said aligned holes to secure said unitary housing to said mounting support.

5. The drive mechanism of claim 1 wherein said flanges are provided with aligned holes, said first securing means having short bolts extended through a portion of said aligned holes to secure said housings together, and said second securing means having long bolts extended through other of said aligned holes to secure said unitary housing to said mounting support.

6. The drive mechanism of claim 1 wherein an input drive shaft extends into said first housing for driving said clutch assembly, an output drive shaft extends outwardly from said second housing into said third housing for driving said final drive assembly, and means are provided within said unitary housing for driving said output shaft selectively by said clutch assembly.

7. The drive mechanism of claim 1 wherein the steering clutch assembly is carried by said first housing for removal as a unit therewith.

8. The drive mechanism of claim 1 wherein the brake assembly is carried by said second housing for removal as a unit therewith.

* * * * *

UNITED STATES PATENT OFFICE
CERTIFICATE OF CORRECTION

Patent No. 4,082,156          Dated April 4, 1978

Inventor(s) Ronald L. Krolak et al.

It is certified that error appears in the above-identified patent and that said Letters Patent are hereby corrected as shown below:

Column 4, line 41, "exended" should read -- extended --.

Signed and Sealed this

Seventeenth Day of October 1978

[SEAL]

Attest:

RUTH C. MASON
Attesting Officer

DONALD W. BANNER
Commissioner of Patents and Trademarks